United States Patent [19]

Wick

[11] 4,054,022
[45] Oct. 18, 1977

[54] LAWN MOWER PLANETARY GEAR BLADE CLUTCH AND BRAKE

[75] Inventor: Gerald H. Wick, Galesburg, Ill.

[73] Assignee: Outboard Marine Corporation, Waukegan, Ill.

[21] Appl. No.: 704,283

[22] Filed: July 12, 1976

[51] Int. Cl.² .......................................... A01D 69/10
[52] U.S. Cl. .................... 56/11.3; 192/17 R
[58] Field of Search ............... 56/10.5, 11.3, 11.5, 56/11.7, 11.8, 16.7, 16.9, 255; 192/17 R, 20

[56] References Cited

U.S. PATENT DOCUMENTS

| | | | |
|---|---|---|---|
| 2,496,608 | 2/1950 | Thomas | 56/11.5 |
| 3,013,372 | 12/1961 | Basham | 56/11.8 |
| 3,228,177 | 1/1966 | Coates | 56/10.5 |
| 3,253,391 | 5/1966 | Meldahl | 56/11.3 |
| 3,604,208 | 9/1971 | Borunda | 56/11.5 |

Primary Examiner—Russell R. Kinsey
Attorney, Agent, or Firm—Michael, Best & Friedrich

[57] ABSTRACT

Disclosed herein is a lawn mower comprising a cutter blade housing supported for movement along the ground, a cutter blade assembly including a cutter blade, and a gear housing fixed to the cutter blade and including therein a first pinion and a second pinion in mesh with the first pinion, a drive shaft extending into the gear box and having fixed thereon the first pinion, and mechanism mounting the second pinion in the gear box about a rotary axis fixed with respect to the gear box, which mechanism is operable to selectively prevent and permit rotation of the pinion relative to the gear box.

14 Claims, 3 Drawing Figures

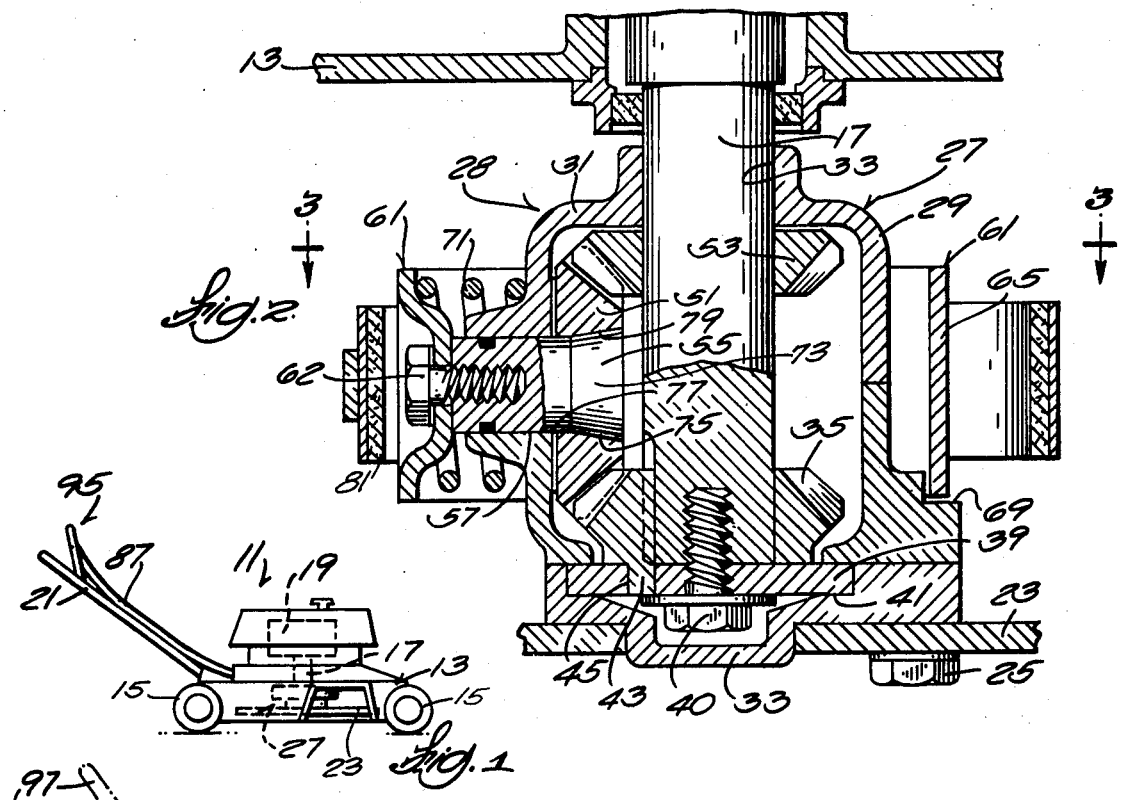
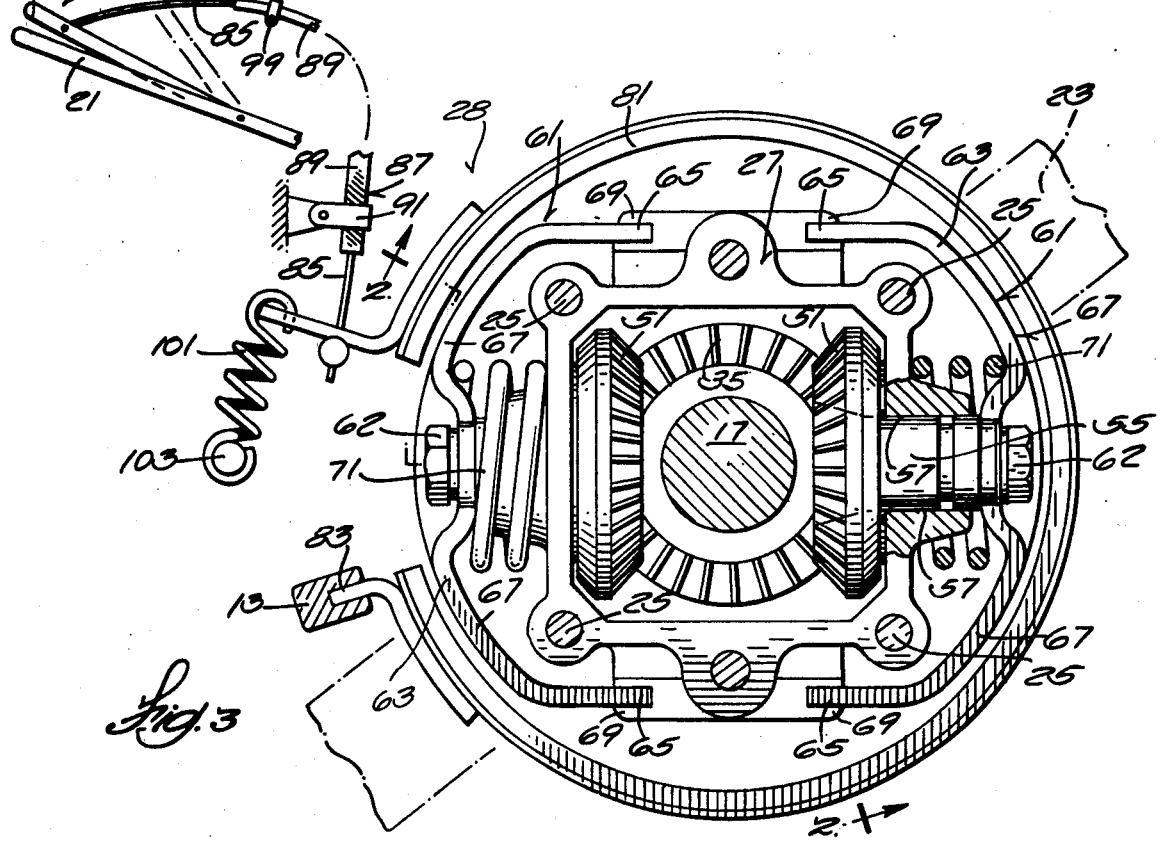

dental # 4,054,022

LAWN MOWER PLANETARY GEAR BLADE CLUTCH AND BRAKE

BACKGROUND OF THE INVENTION

The invention relates generally to rotary lawn mowers and more particularly to rotary lawn mowers including a clutch operable to engage and disengage a cutter blade with respect to a prime mover. Still more particularly, the invention relates to rotary lawn mowers in which cutter blade rotation is simultaneously braked incident to disengagement of the clutch.

Attention is directed to the U.S. Hoff Pat. No. 3,026,665 issued Mar. 27, 1962 and to the U.S. Meldahl Pat. No. 3,253,391 issued May 31, 1966.

SUMMARY OF THE INVENTION

The invention provides a lawn mower comprising a cutter blade housing supported for movement along the ground, a cutter blade assembly including a cutter blade, and a gear housing fixed to the cutter blade and including therein a first pinion, and a second pinion in mesh with the first pinion, a drive shaft extending into the gear box and having fixed thereon the first pinion, and means mounting the second pinion in the gear box about a rotary axis fixed with respect to the gear box, which mounting means includes means operable for selectively preventing and permitting rotation of the second pinion relative to the gear box.

In one embodiment of the invention, the lawn mower further includes means for braking rotation of the gear box assembly, means for biasing the braking means to brake the gear box assembly against rotation and for biasing the selectively operable means to permit rotation of the second pinion relative to the gear box, and manually operable means for overpowering the biasing means.

In one embodiment according to the invention, the lawn mower also includes first means biasing the selectively operable means to prevent rotation of the second pinion relative to the gear box, and second means for biasing the selectively operable means to permit rotation of the second pinion relative to the gear box, which second biasing means normally overpowers the first biasing means, and manually operable means for overpowering the second biasing means and for braking rotation of the gear box assembly.

In one embodiment of the invention, the lawn mower further includes a third pinion, means mounting the third pinion in the gear box and in mesh with the first pinion in diametrically opposing relation to the second pinion about a rotary axis fixed with respect to the gear box, and a fourth pinion carried by the drive shaft for rotation within the gear box relative to the drive shaft and in mesh with the second and third pinions, and wherein the selectively operable means also is operable to selectively prevent and permit rotation of the third pinion relative to the gear box.

In accordance with one embodiment of the invention, the selectively operable means comprises means on the second pinion defining therein an axial bore and a mounting stud carried by the gear box for movement radially of the drive shaft between a radially inner position and a radially outer position, which stud engages the bore to afford relative rotation between the second pinion and the stud when the stud is in the inner position and to lock the second pinion to the stud when the stud is in the outer position.

In accordance with an embodiment of the invention, the bore includes a cylindrical portion and a conical portion converging outwardly with respect to the drive shaft, and the stud includes a cylindrical portion adapted to mate with the cylindrical portion of the pinion bore when the stud is in the inner position to permit relative rotation between the second pinion and the stud, and a conical portion adapted to mate with the conical portion of the pinion bore when the stud is in the outer position so as thereby to lock the second pinion to the stud. Also included in the mounting means is means preventing rotation of said stud relative to said gear box, and a brake band engageable with said gear box assembly to prevent rotation of said gear box assembly, together with means biasing the brake band to a position engaging the gear box assembly so as to brake rotation of the gear box assembly and so as to displace the stud to the inner position to thereby permit rotation of the second pinion relative to the stud, and manually operable means for overpowering the means biasing the brake band. In addition, the lawn mower further includes means for biasing the stud to the outer position so as to prevent rotation of the second pinion relative to the gear box, which means for biasing the stud is normally overpowered by the means biasing the brake band in the absence of operation of the manually operable means for overpowering the means biasing the brake band.

One of the principal features of the invention is the provision of a rotary lawn mower including a combined planetary gear clutch and braking arrangement for controlling rotation of a cutter blade.

Another of the principal features of the invention is the provision in a rotary lawn mower of a combined planetary gear clutch and braking arrangement which, in the absence of a manually applied force, is biased into a condition in which a cutter blade is braked against rotation and a drive shaft idles within a gear box.

Still another of the principal features of the invention is the provision of a rotary lawn mower including a combined planetary gear clutch and braking arrangement which, in the absence of a manually applied force, brakes the cutter blade against rotation while simultaneously permitting unhindered starting of a prime mover.

Other features and advantages of the embodiments of the invention will become known by reference to the following general description, claims, and appended drawings.

THE DRAWINGS

FIG. 1 is a schematical side elevational view of a lawn mower incorporating various of the features of the invention.

FIG. 2 is a fragmentary view, partially broken away and in section, taken along line 2—2 of FIG. 3 illustrating a combined brake and clutch mechanism incorporated in the mower shown in FIG. 1.

FIG. 3 is a partially schematic view taken generally along line 3—3 of FIG. 2, and additionally illustrating the connection of the combined brake and clutch mechanism to an operating lever mounted on the handle of the lawn mower shown in FIG. 1.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a rotary lawn mower 11 including a blade housing 13 which is suitably supported for travel above the ground, as for instance, by a series of wheels 15. Carried by the blade housing 13 is a drive shaft 17 which can be driven by any suitable means, as for instance, by an engine 19 mounted on the blade housing 13. Also included in the lawn mower shown in FIG. 1 is any suitable means for steering thereof. In the illustrated construction, a handle 21 is connected to the blade housing 13 and extends upwardly and rearwardly therefrom.

Enclosed by the blade housing 13 is a cutter blade 23 which is fixed, as by bolts 25, to a gear box or housing 27 which is rotatably mounted on the lower end of the drive shaft 17 and which forms part of a combined planetary gear clutch and braking mechanism 28. More particularly, the gear box or housing 27 comprises a downwardly open cup shaped member 29 having, in the top wall 31 thereof, an aperture 33 through which the drive shaft 17 extends so as to enter the gear box 27. At the open lower end of the cup shaped member 29, the gear box 27 is closed by a cover 33 connected to the cup shaped member 29 by the bolts 25 which also fix the cutter blade 23 to the gear box 27.

Inwardly of the cover 33, the lower end of the drive shaft 17 had keyed thereon a drive gear or pinion 35 and carries annular washer or element 39 which is fixed to the drive shaft 17 by a bolt 40 and which projects into an annular groove 41 between the cup shaped member 29 and the cover 33 so as thereby to retain the gear box 27 on the drive shaft 17 while permitting relative rotation between the gear box 27 and the washer 39. Preferably, means are provided for preventing rotation of the washer 39 relative to the drive shaft 17. While various arrangements can be employed, in the illustrated construction, the drive pinion 35 includes a tang 43 which projects into an aperture 45 in the washer 39 to prevent relative rotation between the washer 39 and the drive shaft 17 and so as thereby to reduce the possibility of loosening the bolt 40 from the drive shaft 17.

Also located in the gear box 27 are one or more, and preferably two, diametrically opposed gears or pinions 51 which are in mesh with the drive pinion 35 and which are also preferably in mesh with an idler gear or pinion 53 journaled on the drive shaft 17 adjacent to the top wall 31 of the gear box 27.

The opposed pinions 51 are carried by the gear box 27 by means selectively permitting and preventing rotation of the pinions 51 relative to the gear box 27. In this last regard, the pinions 51 are respectively carried on studs or stub shafts 55 which respectively project through diametrically aligned horizontal bores 57 in the gear box 27 and which are movable axially in the bores 57 between outwardly extended positions and inwardly retracted positions. In addition, means are provided for preventing rotation of the stub shafts 55 relative to the gear box 27. While various arrangements could be employed, as for instance, splined or other connections between the stub shafts 55 and the gear box 27, in the illustrated construction, rotation of the stub shafts 55 relative to the gear box 27 is prevented by respective wing elements 61 which are fixed to the stub shafts 55 as by bolts 62 and which respectively include oppositely projecting wing portions 63. The wing portions 63 each extend arcuately and include free end parts 65 and intermediate arcuate parts 67 which have a common radius from the drive shaft axis. The means for preventing rotation of the stub shafts 55 relative to the gear box 27 further includes engagement of the free end part 65 of each of the wing portions 63 with a ledge or shoulder 69 formed on the outer surface of the gear box 27 so as to interfere with rotation of the wing elements 61 and connected stub shafts 55 about the axis of the bores 57.

Means are provided for biasing the stub shafts 55 to the outwardly extending positions. While various arrangements could be employed, in the illustrated construction, such means comprises respective helical springs 71 which encircle the stub shafts 55 and which, at their ends, bear between the gear box 27 and the wing elements 61.

Means are provided for selectively preventing and permitting rotation of the pinions 51 relative to the stub shafts 55 in response to axial movement of the stub shafts 55. Thus, in the disclosed construction, the stub shafts 55 respectively include portions 73 which extend through apertures 75 in the pinions 51. The respective stub shafts 55 and apertures 75 include mating cylindrical surfaces 77 which afford relative rotation between the pinions 51 and the stub shafts 55. In addition, the respective stub shafts 55 and apertures 75 include mating conical surfaces 79 which converge outwardly. When the stub shafts 55 are located in the inwardly retracted positions, the mating conical surfaces 79 are spaced and the mating cylindrical surfaces 77 permit relative rotation between the pinions 51 and the stub shafts 55. When the stub shafts 55 are located in their outwardly extending positions, the mating conical surfaces 79 frictionally interengage to lock the pinions 51 on the stub shafts 55 and thereby prevent rotation of the pinions 51 relative to the gear box 27.

Thus, when the stub shafts 55 are located in their outwardly extended positions by action of the springs 71 and the pinions 51 are thereby locked against rotation relative to the gear box 27, rotation of the drive shaft 17 causes rotation of the gear box 27 and connected cutter blade 23. When the stub shafts 55 are in their inwardly retracted positions, and the pinions 51 are free to rotate relative to the gear box 27, drive shaft rotation can cause rotation of the pinions 51 about their horizontal axis without causing rotation of the gear box 27 about the drive shaft axis.

Means are provided for displacing the stub shafts 55 inwardly to their retracted positions against the action of the springs 71 and for braking rotation of the gear box 27 and connected cutter blade 23. While various arrangements are possible, in the illustrated construction, a brake band 81 encircles the gear box 27 in radially outwardly adjacent relation to the arcuate parts 67 of the wing elements 61. The brake band 81 is suitably anchored, adjacent one end, to the blade housing 13 as indicated at 83 and, at its other end, is connected to the inner core 85 of a push-pull cable 87 which also includes an outer casing or sheath 89 suitably anchored to the blade housing 13 by a bracket 91.

The push-pull cable 87 extends outwardly in the vicinity the handle 21 to adjacent an operating lever 95 carrried by the handle 21 for movement between a position adjacent to the handle 21 and a second position with at least a part 97 of the operating lever 95 spaced from the handle 21. The outer casing 89 of the push-pull cable 87 is fixed relative to the handle 21 by a suitable bracket 99 (shown schematically) and the inner core 85 of the push-pull cable 87 is connected to the operating lever 95 so that, when the operating lever 95 is in the position adjacent to the handle 21, the brake band 81 is spaced from the arcuate parts 67 of the wing elements 61 and so that, when the operating lever 95 is in the second position, the brake band 81 is collapsed around the wing elements 61 so as to brakingly engage the brake band 81 with the wing elements 61 to thereby prevent rotation of the gear box 27 relative to the blade housing 13, and so as to displace the stub shafts 55 inwardly to thereby permit rotation of the pinions 51 relative to the gear box 27.

Means are provided for biasing the operating lever 95 to the position spaced from the handle 21 and for biasing the brake band 81 to the position braking rotation of the gear box 27 and inwardly locating the stub shafts 55 to permit rotation thereon of the pinions 51.

While various arrangements can be employed, in the illustrated construction, such means comprises a spring 101 anchored, at one end, to a post 103 extending from the blade housing 13 and connected, at its other end, to adjacent the connection of the brake band 81 and the inner core 85 of the push-pull cable 87. Thus the spring 101 serves simultaneously to displace the lever 95 to the second or spaced position and to locate the brake band 81 in collapsed engagement with the wing elements 61 to thereby brake rotation of the gear box 27 and thereby prevent cutter blade rotation notwithstanding engine operation. In addition, when the operating lever 95 is in the second or spaced position, the engine 19 can be started without causing cutter blade rotation.

In order to obtain cutter blade rotation, the operator manually displaces the operating lever 95 to the first position located adjacent to the handle 21, against the action of the spring 101, so as thereby to displace the brake band 81 outwardly from the wing elements 61 and thereby permit outward movement of the stub shafts 55 under the action of the springs 71 to lock the pinions 51 on the stub shafts 55 and, accordingly, to the gear box 27 and consequently cause gear box rotation in response to drive shaft rotation. Release of the operating lever 95 will cause, in response to the action of the spring 101, movement of the operating lever 95 to the spaced position and movement of the brake band 81 to the position braking the gear box 27 against rotation and displacing the stub shafts 55 inwardly so as to permit idling rotation of the pinions 51 on the stub shafts 55 without causing rotation of the gear box 27 and connected cutter blade 23 in response to drive shaft rotation.

Various of the features of the invention are set forth in the following claims.

What is claimed is:

1. A lawn mower comprising a housing supported for movement along the ground, a cutter blade assembly including a cutter blade, and a gear housing fixed to said cutter blade and including therein a first pinion, and a second pinion in mesh with said first pinion, a drive shaft extending into said gear box and having fixed thereon said first pinion, and means mounting said second pinion in said gear box about a rotary axis fixed with respect to said gear box, said mounting means including means operable for selectively preventing and permitting rotation of said second pinion relative to said gear box.

2. A lawn mower in accordance with claim 1 and further including first means biasing said selectively operable means to prevent rotation of said second pinion relative to said gear box.

3. A lawn mower in accordance with claim 2 and further including second means for biasing said selectively operable means to permit rotation of said second pinion relative to said gear box, said second biasing means normally overpowering said first biasing means, and manually operable means for overpowering said second biasing means and for permitting rotation of said gear box assembly.

4. A lawn mower in accordance with claim 1 and further including a third pinion, means mounting said third pinion in said gear box and in mesh with said first pinion in diametrically opposing relation to said second pinion about a rotary axis fixed with respect to said gear box, and a fourth pinion carried by said drive shaft for rotation within said gear box relative to said drive shaft and in mesh with said second and third pinions, and wherein said selectively operable means also is operable to selectively prevent and permit rotation of said third pinion.

5. A lawn mower in accordance with claim 1 wherein said selectively operable means comprises means on said second pinion defining therein an axial bore and a mounting stud carried by said gear box for movement radially of said drive shaft between a radially inner position and a radially outer position, said stud engaging said bore to afford relative rotation between said second pinion and said stud when said stud is in said inner position and to lock said second pinion to said stud when said stud is in said outer position.

6. A lawn mower in accordance with claim 5 wherein said bore includes a cylindrical portion and a conical portion converging outwardly with respect to said drive shaft, and said stud includes a cylindrical portion adapted to mate with said cylindrical portion of said pinion bore when said stud is in said inner position to permit relative rotation between said second pinion and said stud and a conical portion adapted to mate with said conical portion of said pinion bore when said stud is in said outer position so as thereby to lock said second pinion to said stud.

7. A lawn mower in accordance with claim 5 wherein said mounting means includes means preventing rotation of said stud relative to said gear box.

8. A lawn mower in accordance with claim 7 wherein said stud extends exteriorly of said gear box and said means preventing rotation of said stud is fixed on said stud exteriorly of said gear box.

9. A lawn mower in accordance with claim 7 wherein said means preventing rotation of said stud comprises a wing element fixed to said stud and engageable with said gear box to prevent rotation of said stud relative to said gear box.

10. A lawn mower in accordance with claim 9 and further including a spring engaged between said gear box and said wing element for urging said stud to said outer position.

11. A lawn mower in accordance with claim 9 and further including a brake band engageable with said wing element to prevent rotation of said gear box assembly.

12. A lawn mower in accordance with claim 11 and further including means biasing said brake band to a position engaging said wing element so as to brake rotation of said gear box assembly and so as to displace said stud to said inner position to thereby permit rotation of said second pinion relative to said stud, and manually operable means for overpowering said means biasing said brake band.

13. A lawn mower in accordance with claim 12 and further including means for biasing said stud to said outer position so as to prevent rotation of said second pinion relative to said gear box, said means for biasing said stud being normally overpowered by said means biasing said brake band in the absence of operation of said manually operable means for overpowering said means biasing said brake band.

14. A lawn mower in accordance with claim 1 and further including means for braking rotation of said gear box assembly, means for biasing said braking means to brake said gear box assembly against rotation and for biasing said selectively operable means to permit rotation of said second pinion relative to said gear box, and manually operable means for overpowering said biasing means.

* * * * *